United States Patent
Riskas

(10) Patent No.: US 10,538,348 B2
(45) Date of Patent: Jan. 21, 2020

(54) TRIGGERED SATELLITE DEPLOYMENT MECHANISM

(71) Applicant: Vector Launch Inc., Tucson, AZ (US)

(72) Inventor: Brian James Riskas, Nipomo, CA (US)

(73) Assignee: Vector Launch Inc., Tucson, AZ (US)

( * ) Notice: Subject to any disclaimer, the term of this patent is extended or adjusted under 35 U.S.C. 154(b) by 462 days.

(21) Appl. No.: 15/383,968

(22) Filed: Dec. 19, 2016

(65) Prior Publication Data

US 2018/0170586 A1 Jun. 21, 2018

(51) Int. Cl.
*B64G 1/64* (2006.01)
*B64G 1/10* (2006.01)

(52) U.S. Cl.
CPC .............. *B64G 1/645* (2013.01); *B64G 1/10* (2013.01)

(58) Field of Classification Search
CPC .......... B64G 1/645; B64G 1/641; B64G 1/10
See application file for complete search history.

(56) References Cited

U.S. PATENT DOCUMENTS

| 4,300,737 | A | | 11/1981 | Byrne et al. | |
|---|---|---|---|---|---|
| 5,126,115 | A | | 6/1992 | Fujita et al. | |
| 6,126,115 | A | * | 10/2000 | Carrier | B64G 1/641 |
| | | | | | 244/137.4 |
| 9,731,822 | B1 | * | 8/2017 | Erian | B64D 1/12 |
| 2009/0301457 | A1 | | 12/2009 | De Lair et al. | |
| 2014/0131521 | A1 | | 5/2014 | Apland et al. | |
| 2014/0319283 | A1 | * | 10/2014 | Holemans | B64G 1/641 |
| | | | | | 244/173.3 |
| 2015/0329224 | A1 | * | 11/2015 | Sachdev | B64G 1/641 |
| | | | | | 244/173.3 |
| 2015/0353211 | A1 | | 12/2015 | London et al. | |
| 2016/0311562 | A1 | * | 10/2016 | Apland | B64G 1/641 |
| 2017/0096240 | A1 | * | 4/2017 | Cook | B64G 1/64 |

OTHER PUBLICATIONS

"1U-3U CubeSat Design Specification", Rev. 13, The CubeSat Program, Cal Poly, San Luis Obispo, Feb. 20, 2014, 42 pages.
"6U CubeSat design Specification", The CubeSat Program, Cal Poly, San Luis Obispo, Apr. 20, 2016, 27 pages.

* cited by examiner

*Primary Examiner* — Valentina Xavier

(57) ABSTRACT

Provided herein are various improvements to satellite or payload deployment systems and equipment. In one example, a satellite deployment apparatus is provided. The satellite deployment apparatus includes opposing retention members configured to engage protrusions of a satellite and hold the satellite with respect to a baseplate. The satellite deployment apparatus includes at least one pusher element configured to preload a deployment force on the satellite against the opposing retention members when the protrusions of the satellite are captive in the opposing retention members, and a deployment mechanism configured to spread the opposing retention members responsive to triggering by an actuator system and release the protrusions of the satellite for deployment of the satellite away from the baseplate using at least the deployment force.

19 Claims, 9 Drawing Sheets

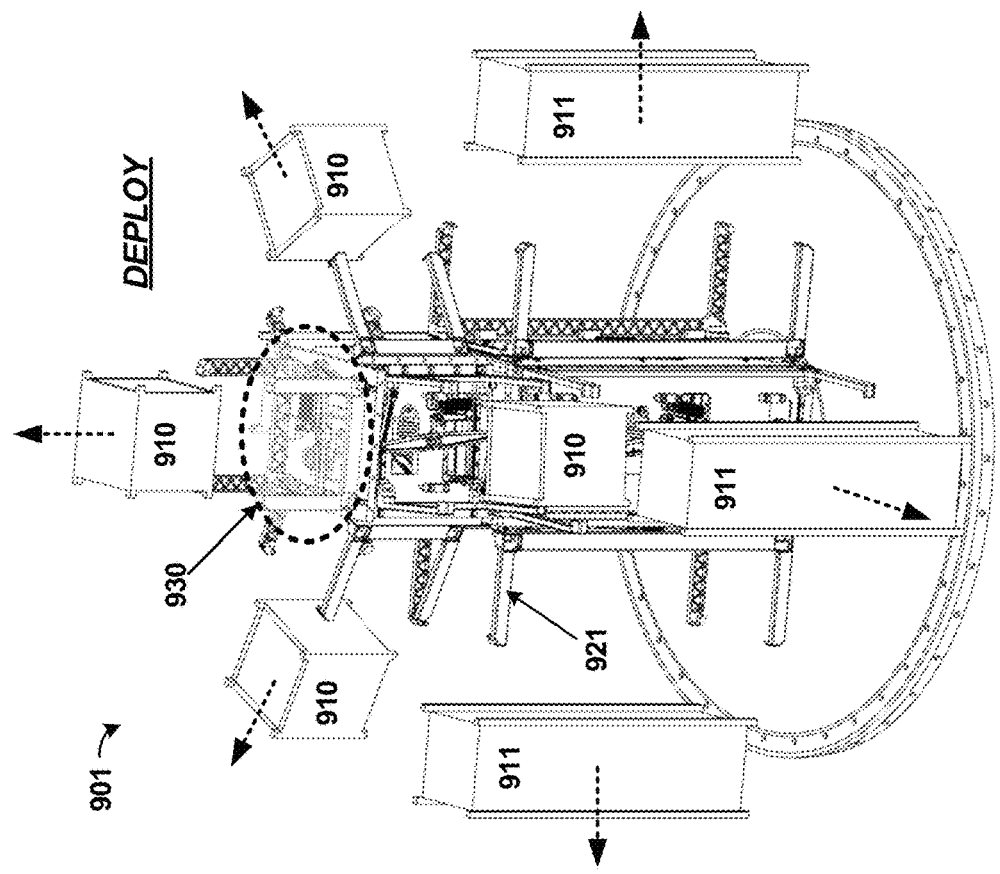
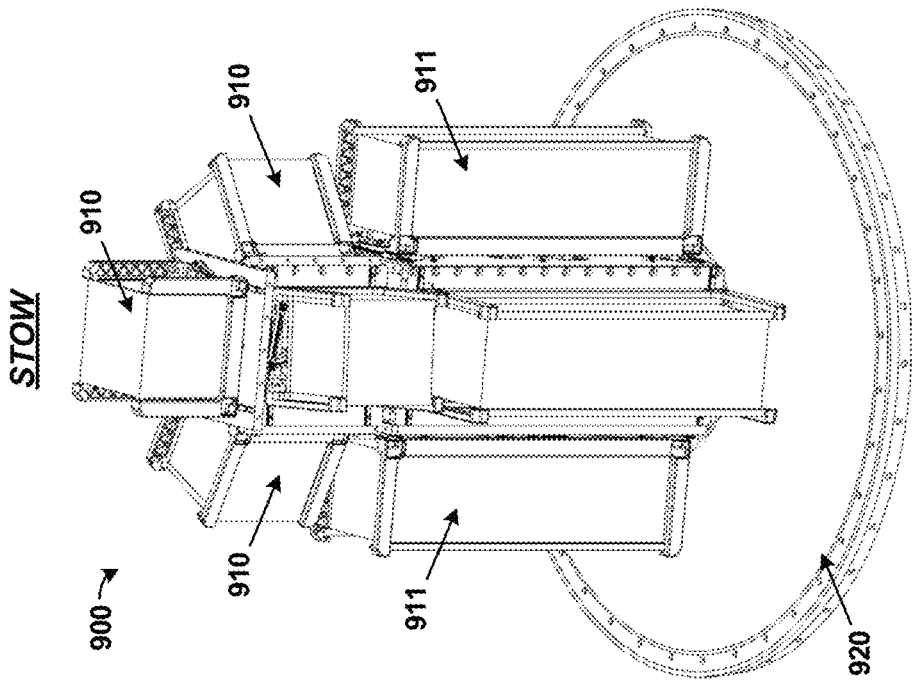
FIGURE 9

TRIGGERED SATELLITE DEPLOYMENT MECHANISM

TECHNICAL BACKGROUND

Satellites and other payloads can be carried by launch systems, such as rocket vehicles, into orbit or other destinations in space. Once the launch system reaches a destination or desired orbit characteristic, then payload satellites, probes, or other payloads can be deployed and placed into a functioning mode. Satellites can be placed into Earth orbit (or into orbit around other bodies), and these satellites can perform various tasks, such as sensing, surveillance, communications, or scientific experimentation.

Example satellites include CubeSat-based satellites. CubeSats are a standardized miniaturized satellite architecture for use in inexpensive and rapidly developed space/orbital platforms. CubeSats can come in 10×10×11.35 centimeter (cm) modular units and multiples thereof. CubeSats allow any number of functions and operations to be deployed into a modular format that includes a standardized chassis to which developers can mount electronics, propulsion systems, sensors, experiments, or other equipment. However, deployment of CubeSats and various other types of satellites and space-faring probes can be challenging due to the environment of space as well as the rigors of launch. Moreover, traditional deployment systems for CubeSats include bulky metallic box enclosures that lead to significant restrictions on size and weight of the associated CubeSats.

OVERVIEW

Provided herein are various improvements to satellite or payload deployment systems and equipment. In one example, a satellite deployment apparatus is provided. The satellite deployment apparatus includes opposing retention members configured to engage protrusions of a satellite and hold the satellite with respect to a baseplate. The satellite deployment apparatus includes at least one pusher element configured to preload a deployment force on the satellite against the opposing retention members when the protrusions of the satellite are captive in the opposing retention members, and a deployment mechanism configured to spread the opposing retention members responsive to triggering by an actuator system and release the protrusions of the satellite for deployment of the satellite away from the baseplate using at least the deployment force.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 9 illustrates example satellite deployment systems.

DETAILED DESCRIPTION

Payloads can be carried by launch systems from ground-based locations into orbits of various types or for delivery to other space-related destinations. The payloads, such as satellites, scientific probes, or other objects, can be deployed and then placed into an operational mode. Typically, a deployment mechanism is employed to deploy the payloads away from a stage of the launch system. However, weight and size are critical considerations in launch systems and deployed payloads, due in part to the high cost of launch. Moreover, failure of complex deployment systems can lead to failure to deploy or loss of payload. Provided herein are various improvements to satellite or payload deployment systems and equipment that can be employed in many types of satellite or payload deployment scenarios.

Traditional deployers for small satellites, such as CubeSats, might completely enclose a modular satellite in a metallic box structure, causing significant restrictions on the size and weight of the CubeSats that can be flown. The new mechanisms and systems herein allows for CubeSats or other satellites and payloads to be launched without the weight and volume constraints that are present on traditional deployers. The enhanced examples herein can also be adapted to different size CubeSats (1 U, 1.5 U, 2 U, 3 U, 6 U, etc . . . ) while maintaining similar component types and operations across the various size deployers.

When employed as deployers for CubeSats, the new deployer examples herein can interface to CubeSats using a pair of opposing 'hooks' that slide over a set of small protruding chassis rails that are standard to CubeSats. These hooks are spring-loaded, and held in relative position by a trigger mechanism that, when released, allows the hooks to slide away from the CubeSat chassis rails. A set of compressive spring-loaded pusher plates can be employed to push or accelerate the CubeSat away from the deployment mechanism for deployment.

The CubeSat chassis includes rails typically comprising solid metal members that interface to a standardized Poly Pico satellite Orbital Deployer (PPOD). Spring plungers are inserted into the ends of the conventional chassis rails to help facilitate satellite separation once the CubeSats have left the deployer. Microswitches can also be included in the chassis rails to indicate a successful deployment to control logic/telemetry. Advantageously, in the example herein, a standardized PPOD is not employed and instead an enhanced deployer is provided. Moreover, when the enhanced deployer is used for CubeSat deployment, spring plungers are no longer needed in the CubeSat chassis rails—saving complexity and weight.

Figure 1:
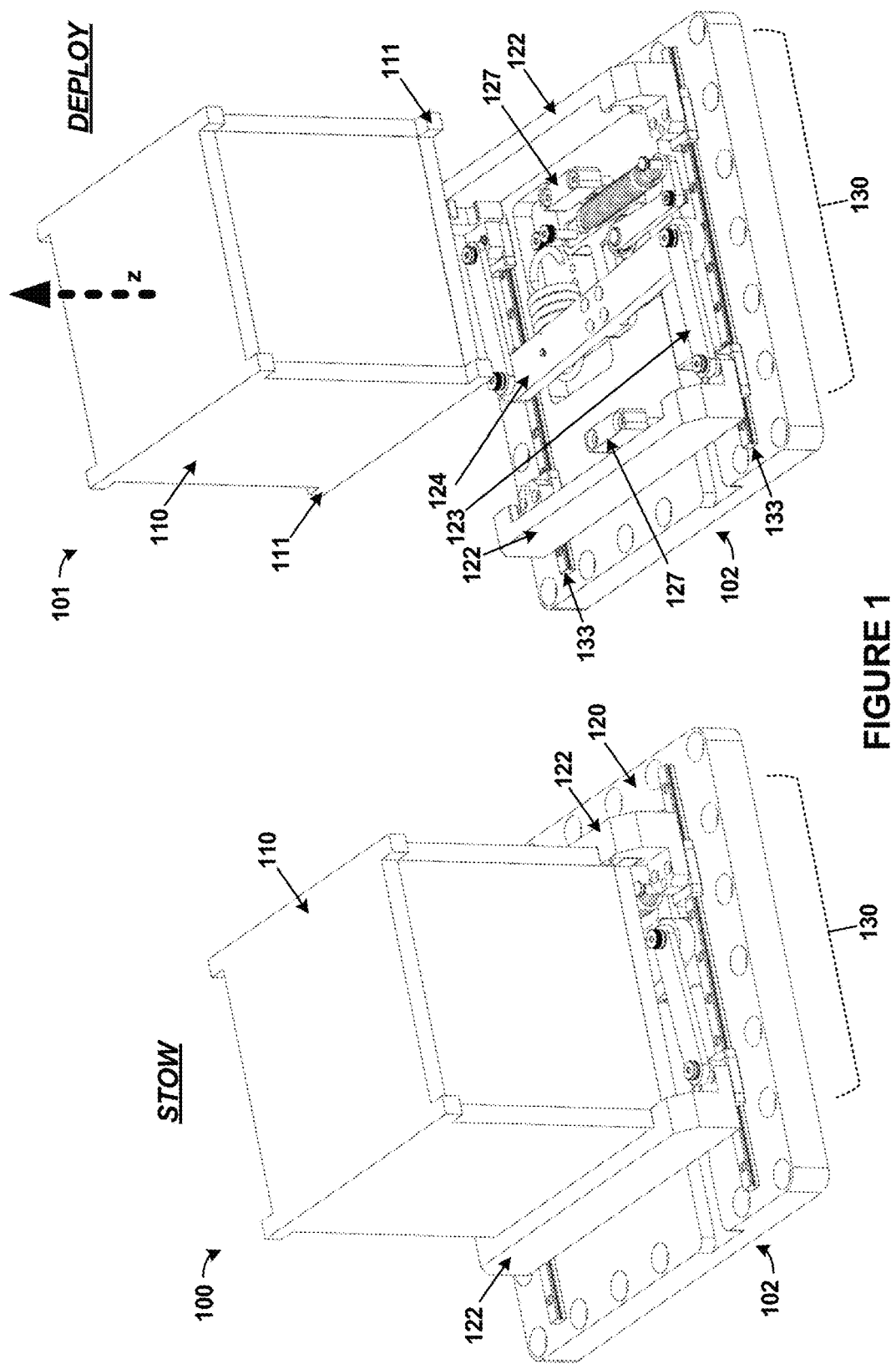
FIG. 1 illustrates satellite deployment systems in an implementation.

In a first example, a payload deployment system is discussed. FIG. 1 illustrates two views of payload deployment system 102. In a first view 100, payload 110 is inserted and stowed into payload deployment system 102. First view 100 illustrates payload 110 in a pre-deployment state. In a second view 101, payload 110 is deployed from payload deployment system 102 into a generally 'z' direction indicted by the movement arrow in FIG. 1.

Turning to the elements of FIG. 1, payload deployment system 102 includes baseplate 120 and deployment mechanism 130. Deployment mechanism 130 includes opposing payload retention members 122, action bars 123, and hammer arm 124, along with further elements detailed below in the subsequent figures. Action bars 123, hammer arm 124, hammer element 125 can be included in a hammer mechanism or hammer assembly.

Payload retention members 122 can slide along linear rails 133 and are generally placed into two relative positions, open and closed. When in the 'closed' relative position, payload retention members 122 engage with protrusions 111 of payload 110 to hold payload 110 with respect to baseplate 120. Payload retention members 122 can slide over linear rails 133, and thus can be considered sliding retention members. At least one pusher element 127 is configured to preload a deployment force on payload 110 against payload retention members 122 when the protrusions of payload 110 are captive in payload retention members 122. The preloading occurs when payload 110 is inserted into payload deployment system 102 to engage protrusions 111 with payload retention members 122. This insertion pushes onto pusher elements 127 which are compressively spring-loaded. Deployment mechanism 130 can spread apart opposing payload retention members 122 to an 'open' relative position responsive to triggering by an actuator system. The actuator system (not shown in FIG. 1) moves hammer arm 124 which is coupled to action bars 123 that move apart payload retention members 122. The spreading of payload retention members 122 then releases protrusions 111 of payload 110 from payload retention members 122, allowing the preloaded deployment force to act upon payload 110 and accelerate payload 110 away from baseplate 120 for deployment.

The elements of payload deployment system 102 can comprise various materials, such as metals, metallic alloys, polymers, plastics, ceramics, or other suitable materials. In one example, aluminum is employed for baseplate 120 and payload retention members 122, among other elements. Titanium can be employed for more wear-prone elements, such as the hammer elements and sear elements discussed below. Steel or other materials can be employed for spring elements and bearing elements, although other materials can be employed. Various surfaces can employ coatings, anodization, hard anodization, or treatments to reduce corrosion, cold welding, electrical conduction, or other undesired conditions.

Figure 2:
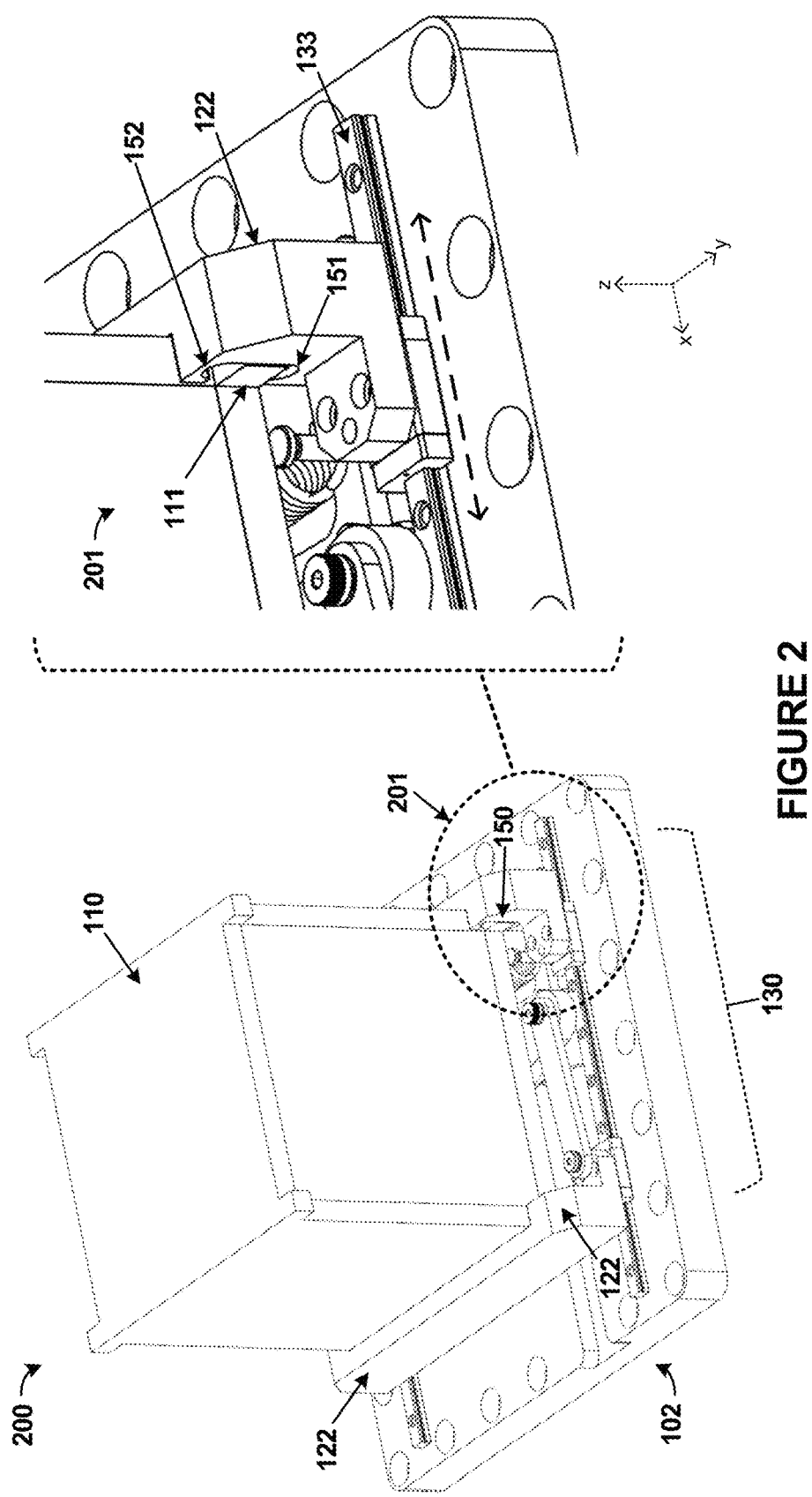
FIG. 2 illustrates a satellite deployment system in an implementation.

Turning now to a detailed view of payload retention members 122, FIG. 2 is presented. FIG. 2 illustrates view 200 that shows a stowed or pre-deployment payload 110 within payload deployment system 102. Some elements are indicated in view 200 for clarity, such as baseplate 120, payload retention members 122, and deployment mechanism 130.

A detailed view 201 of payload retention members 122 is shown in FIG. 2. This detailed view shows a "hook" version of payload retention members 122. A "roller" version of payload retention members 122 can be seen in FIG. 6. In FIG. 2, protrusions 111 of payload 110 are engaged into a space created in ends of payload retention members 122 by lower hook portion 151 and upper hook portion 152 forming a hook 150. When engaged into the end hook 150 of payload retention members 122, protrusions 111 each are constrained in at least two dimensions, namely the x-y plane indicated in FIG. 2, by opposing faces of the hook portions of payload retention members 122. Further, payload 110 is constrained using associated pusher elements 127 in the 'z' axis between a space created by hook portions 151-152. Payload retention members 122 can slide via linear rails 133 in the 'x' direction for engaging and dis-engaging from protrusions 111 of payload 110.

There can be provided a predetermined amount of clearance between the payload protrusions and hook or roller portions of payload retention members 122 that allows for the protrusions to slide into the hook or roller portions. When payload retention members 122 are closed by sliding inward towards each other along linear rails 133, the payload is restrained in at least two dimensions against the face and wall of the hook or roller portions. Pusher plates, such as pusher elements 127, act on a bottom side or rail of the payload, attempting to push the payload away from the baseplate 120. Because the payload is restrained by the hooks or rollers, the pusher plates force the payload against an upper face 152 of the hook or roller, and the friction between the payload protrusions and hook or roller prevents the payload from moving under vibration events. The amount of preload force can be increased by increasing a spring constant or a preload of associated pusher plate springs. In addition, small adjustment pads may be added to the hooks or rollers to take up a predetermined amount of clearance between the protrusions and the hook or roller portions. The adjustment pads can comprise set screws with nylon tips to allow tightening against the payload or protrusions without marring or damaging the payload.

Figure 3:
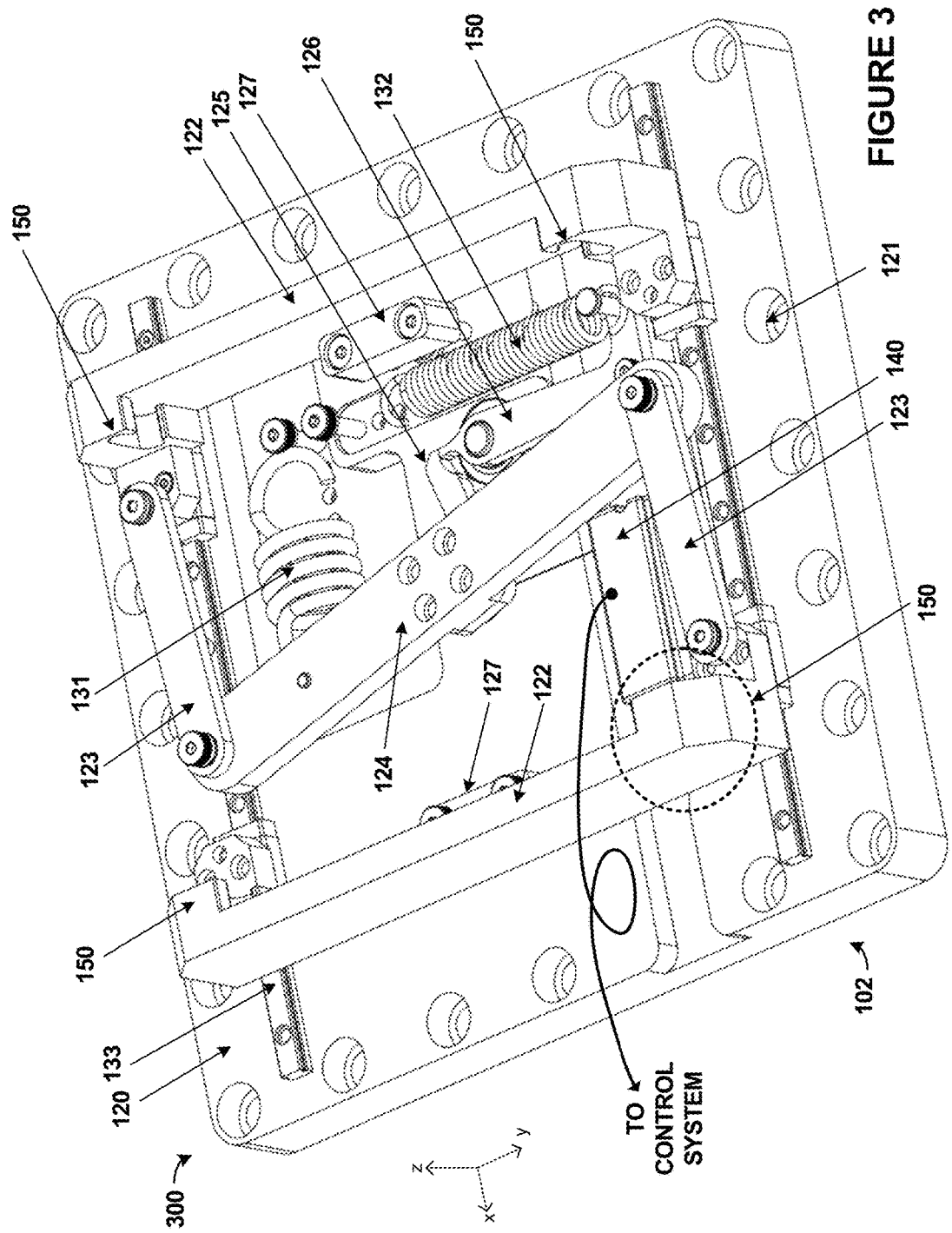
FIG. 3 illustrates a satellite deployment system in an implementation.
Figure 4:
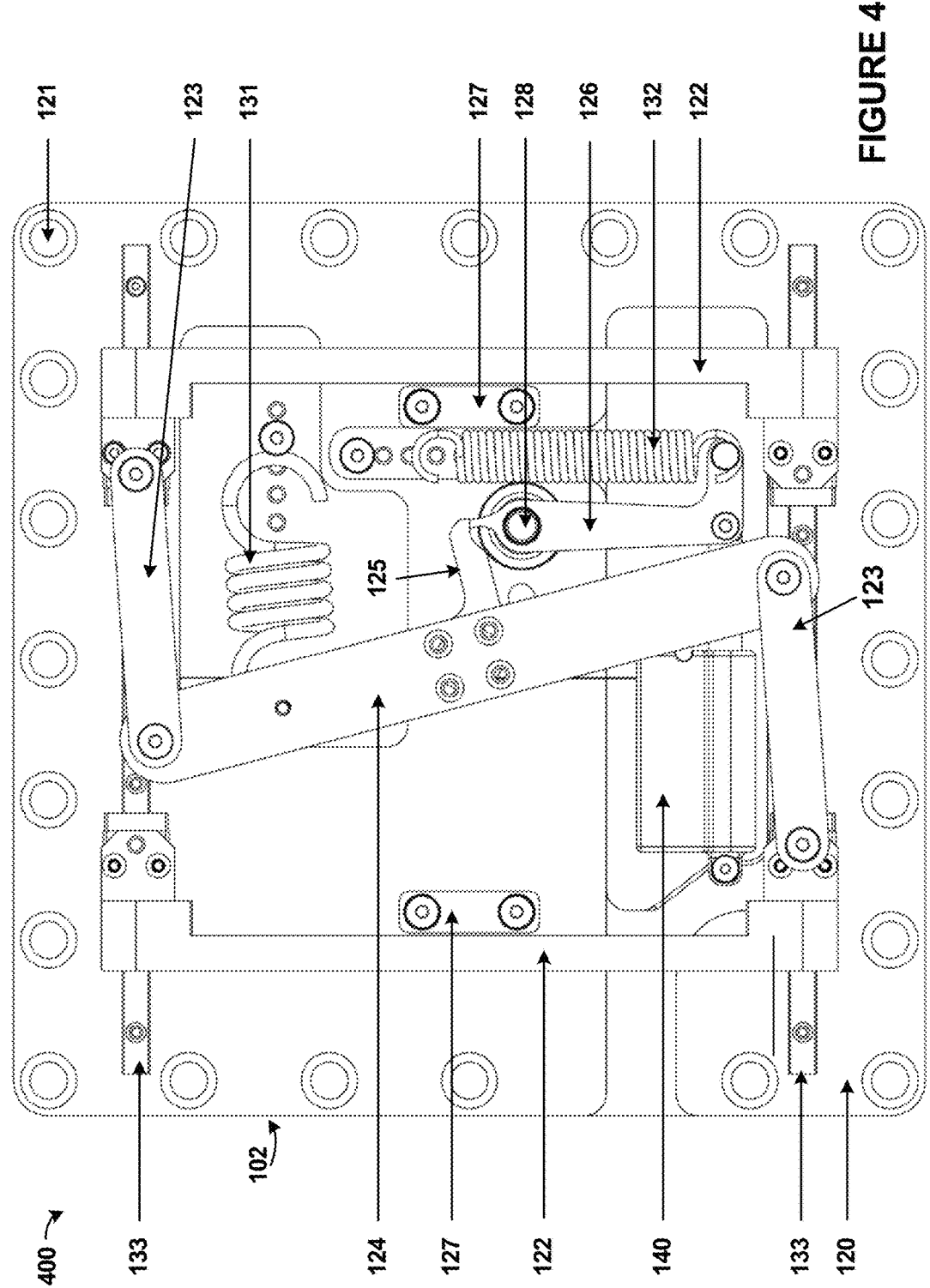
FIG. 4 illustrates a satellite deployment system in an implementation.
Figure 5:
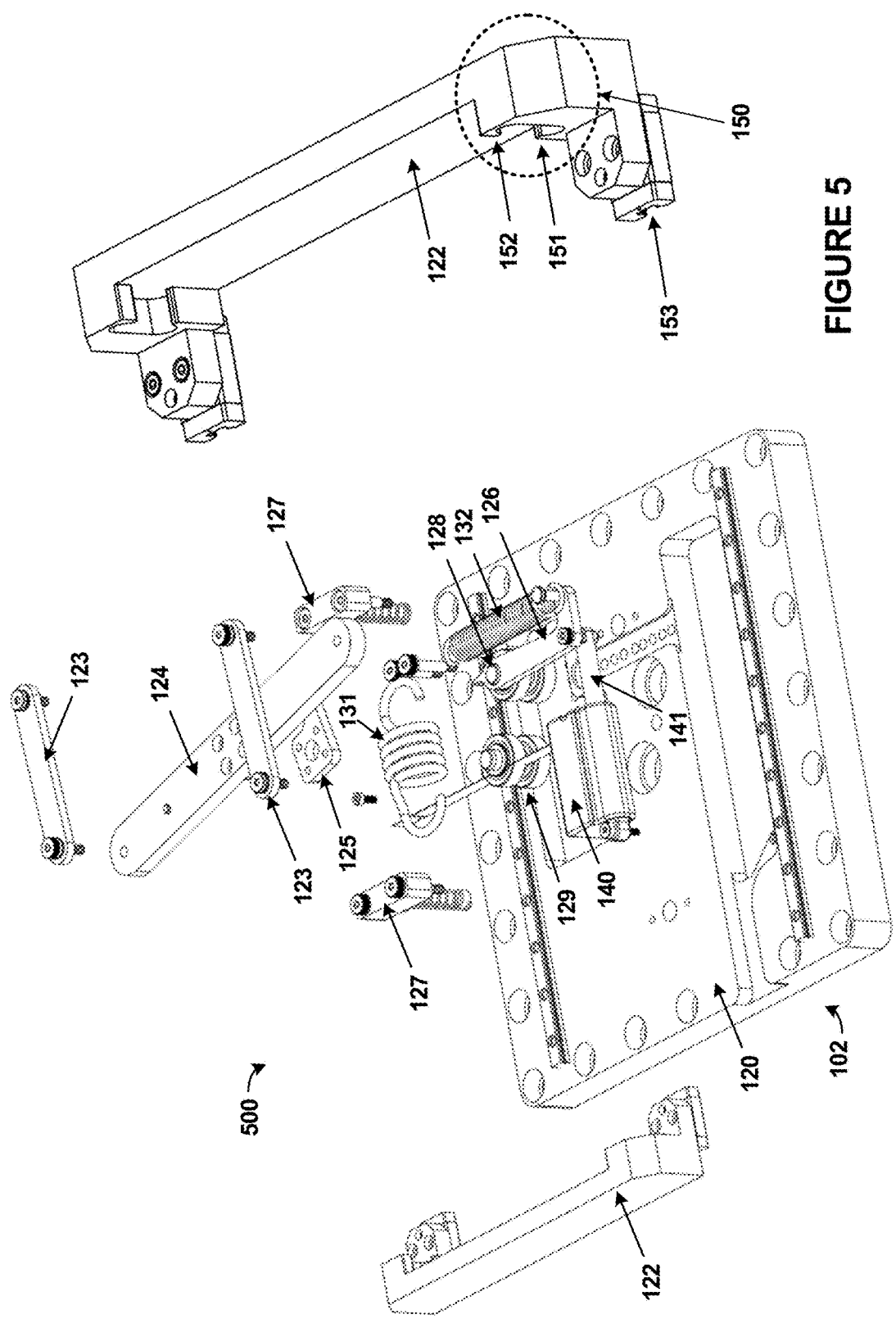
FIG. 5 illustrates a satellite deployment system in an implementation.

FIG. 3 illustrates an isometric view 300 of payload deployment system 102. FIG. 4 illustrates a top view 400 of payload deployment system 102. FIG. 5 illustrates exploded view 500 of payload deployment system 102. Similar elements are included across each of view 300, view 400, and view 500.

In FIGS. 3-5, payload deployment system 102 includes baseplate 120, baseplate mounting features 121, payload retention members 122, action arms 123, hammer arm 124, hammer element 125, sear element 126, pusher elements 127, spring elements 131-132, linear rails 133, and actuator system 140. Deployment mechanism 130 includes several of these elements, namely payload retention members 122, action arms 123, hammer arm 124, hammer element 125, sear element 126, pusher elements 127, spring elements 131-132, linear rails 133, and actuator system 140. Actuator system 140 can be coupled to a control system that might comprise control electronics, control circuitry, activation circuitry, or might include fluid control elements when hydraulic or pneumatic actuators are employed.

In operation, a payload is inserted into deployment mechanism 130 where protrusions on the payload engage into hooks 150 (or rollers) of payload retention members 122. A holding force in the 'x' axis is provided by a spring-loaded mechanism that includes sear element 126 coupled to hammer element 125, hammer arm 124, and action arms 123. Once placed into engagement with payload retention members 122, the payload is held by payload retention members 122 which does not substantially move along linear rails 133 until sear element 126 is triggered by actuator system 140.

Hammer arm 124 is coupled to hammer element 125, such as by fasteners, welds, or other coupling elements. In some examples, hammer element 125 and hammer arm 124 comprise a single piece or part, forming hammer element 125. Hammer element 125 is held against sear element 126 by at least an extension spring. Both hammer element 125 and sear element 126 are pivotably coupled to baseplate 120, such as mounted on bearings that can be pressed into baseplate 120. Sear element 126 is triggered by linear actuator system 140 that causes sear element 126 to release hammer element 125 and hammer arm 124. Hammer arm 124 thus moves when sear element 126 releases hammer element 125 which is coupled to hammer arm 124. Hammer element 125 is pivotably coupled to baseplate 120 and spring loaded by 131. Thus, the combined structure of hammer element 125/hammer arm 124 rotates when released by sear element 126. Hammer arm 124 is pivotably coupled to a pair of action bars 123, which in turn act on payload retention members 122. Payload retention members 122 include rail channels 153 that move on linear guide rails 133, which allow motion of payload retention members 122 and allow payload retention members 122 to slide towards and away from protrusions 111 of payload 110.

Pusher plates, such as pusher elements 127, are typically in contact with a bottom portion of payload 110. Once payload retention members 122 are spread apart by actuator system 140, pusher elements 127 exert a force on payload 110 in the 'z' direction away from baseplate 120, and thus deploy payload 110. Pusher elements 127 each exert a corresponding force onto the payload based on a spring force established during insertion of the payload into deployment mechanism 130. This spring force keeps the protrusions of the payload engaged in the 'z' axis in hooks 150 of payload retention members 122 until payload retention members 122 are spread apart along linear rails 133 by the triggering of actuator system 140. Pusher elements 127 allow payload 110 to be preloaded against hooks 150, establishing an invariant load path and allowing for less vibration to be transferred to payload 110.

During operation of deployment system 102, actuator system 140 exerts a force via actuation arm 141 on sear element 126 which is tensioned by spring 132 and rotates on an associated pivot 128. When a predetermined threshold force is exerted by actuator system 140 onto sear element 126, then sear element 126 will rotate past a 'trigger' feature of sear element 126 and begin to exert a force on hammer element 125 which responsively rotates on an associated pivot 129. Actuator system 140 can be controlled by an associated control system, not shown in FIGS. 3-5 for clarity. This control system can provide power or pressure to an actuator of actuator system to actuate or activate the actuator. Actuator system 140 can be triggered remotely, either by ground control systems or by an onboard timer or control system.

Actuator system 140 can comprise a linear actuator, although variations are possible. The linear actuator can be coupled to baseplate 120 and exert a force onto sear element 126 which responsively rotates about pivot 128. The type of linear actuator can vary. For example, leadscrew actuator can be employed. Other example actuators include solenoid actuators, paraffin actuators, ballscrew actuators, and linear motor actuators, among others, including combinations thereof. Other example actuators include rotational actuators, such as servos, motors, and the like, that rotate sear element 126 directly or through a gearing mechanism.

Further detailed operation of payload deployment system 102 is now discussed. Sear element 126 establishes a locking feature for payload deployment system 102. When payload retention members 122 are placed into the closed relative position to engage protrusions 111 of payload 110, sear element 126 can lock payload retention members 122 into the closed relative position. Spring 132 maintains sear element 126 into the 'locked' position against hammer element 125. This locked or closed relative position can be maintained to hold payload 110 during the rigors of a rocket vehicle launch process or until deployment is desired.

Deployment of payload 110 can be initiated to separate payload 110 from a launch vehicle or vehicle stage, such as once a microgravity environment is established or a desired orbit is achieved. Movement of action bars 123, hammer arm 124, hammer element 125 can be triggered by sear element 126. Sear element 126 can be rotated by actuator system 140. When sear element 126 is rotated past a predetermined threshold angle of rotation, then sear element 126 'triggers' off hammer element 125 and allows hammer element 125 to pivotably rotate with respect to baseplate 120. Since hammer element 125 is coupled to hammer arm 124, then hammer arm 124 also rotates along with hammer element 125. Spring 131 exerts a force onto hammer arm 124 that can rotate hammer 124 when hammer element 125 is released or triggered by sear element 126. Hammer arm 124 is coupled to action bars 123 and rotation of hammer arm 124 and associated movement of action bars 123 converts the rotation into a linear motion of payload retention members 122 along rails 133. This linear motion, triggered initially by sear element 126, spreads payload retention members 122 apart into an open relative position. This open relative position can deploy payload 110 held captive by payload retention members 122 due to the force preloaded by pusher elements 127 during insertion of payload 110 into the deployment mechanism.

Figure 6:
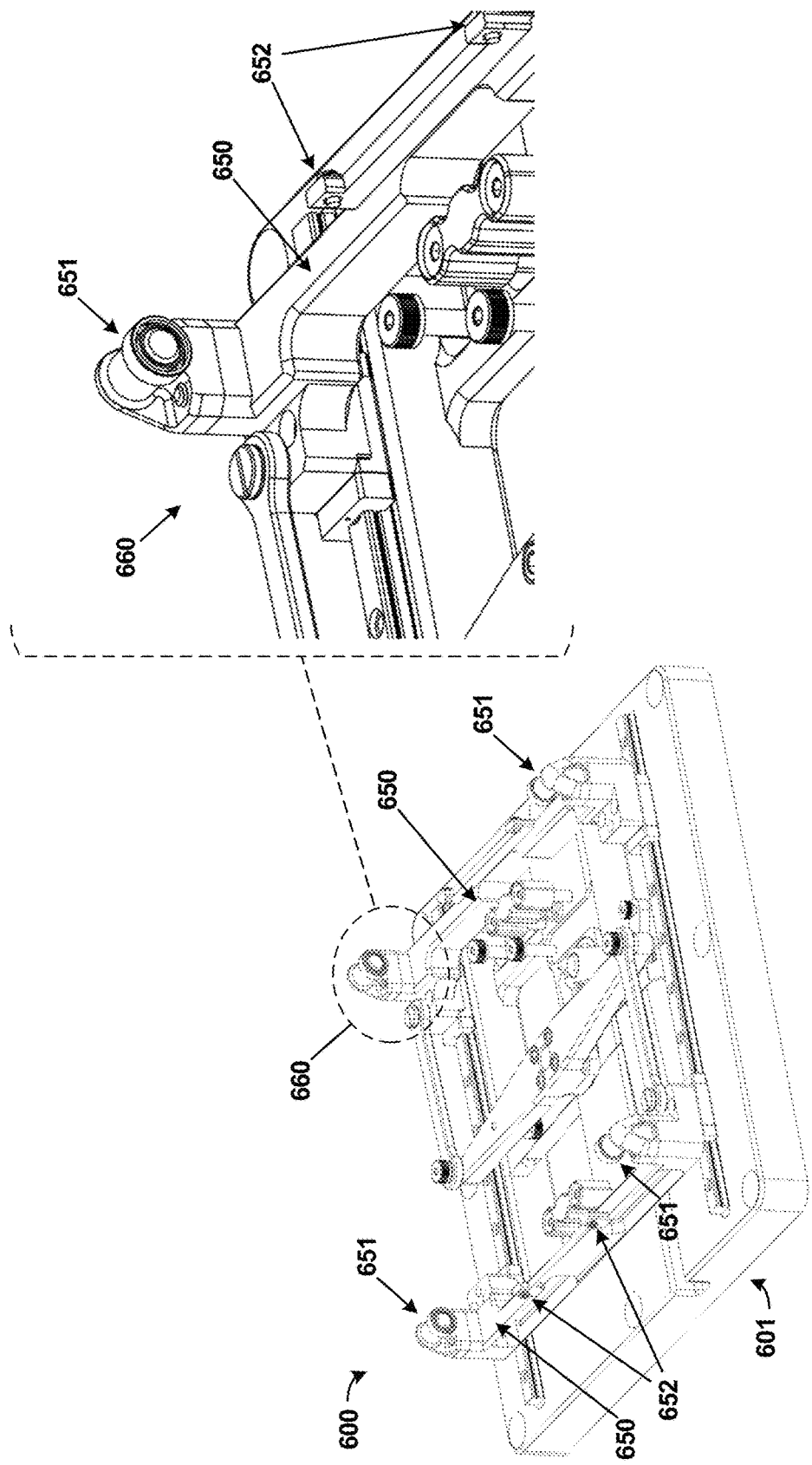
FIG. 6 illustrates a satellite deployment system in an implementation.

FIG. 6 illustrates view 600 of payload deployment system 601. Payload deployment system 601 comprises an alternate configuration of payload deployment system 102. Payload deployment system 601 includes alternate versions of payload retention members 122 as payload retention members 650 that include roller features 651 instead of hook features 150. Payload deployment system 601 also includes tension screw features 652. Payload deployment system 601 also includes weight-reduced versions of pusher elements, hammer arms, action arms, and other elements. The weight-reduced versions have material selectively eliminated while still providing full functionality, as can be seen by comparing versions in FIGS. 3-5 and FIG. 6.

Roller features 651 can be included on one or more ends of one or more payload retention members 650. For example, both payload retention members 650 can include two roller features 651, or just one of payload retention members 650 might include roller features 651 and another includes hook features. Other elements of system 601 can be similar to elements of system 102, although variations are possible. Roller features 651 can further mitigate risk of cold welding between materials of payload protrusions and materials of payload retention members 650, as well as ensure a smooth spreading or expansion of payload retention members 650 apart from each other.

Tension screw features 652 are included in payload retention members 650 to reduce rattling and vibration of the payload during a launch process. Payload retention members 650 can be selectively tightened after the payload is mounted in the deployment mechanism to provide tension or support inward onto the payload.

Figure 7:
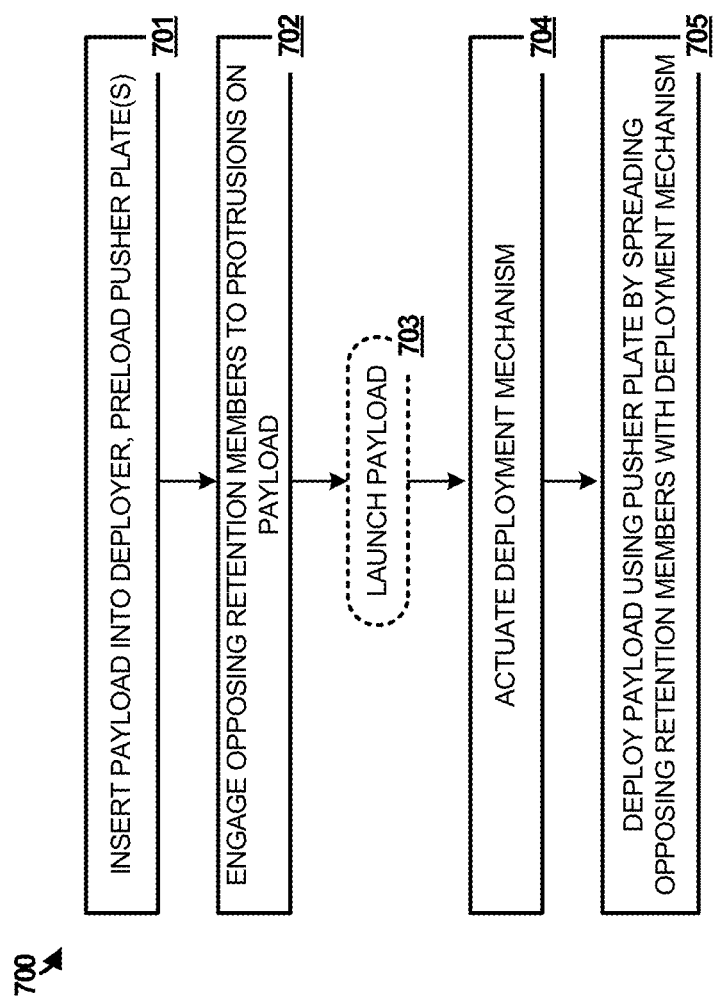
FIG. 7 illustrates a method of deploying a payload in an implementation.

FIG. 7 illustrates a method of operation 700 for a deployment system, such as any of payload deployment system 102 in FIGS. 1-5 or payload deployment system 601 in FIG. 6. In FIG. 7, an operator inserts a payload into a deployer, preloading associated pusher plates during insertion (operation 701). Opposing retention members are engaged onto protrusions of the payload, such as by pushing together retention members to fit protrusions of the payload into hook features or roller features of the retention members (operation 702). The payload can then be mounted along with the deployer onto a launch vehicle, such as that described below in FIG. 9. The payload, along with other payload items, can then be launched via an associated launch system (operation 703). Once the launch system has reached a predetermined location in orbit or otherwise, the deployment mechanism can be activated to deploy the payload. An actuation system can be triggered by a control system on-board the flight system or based on control signals issued by a ground control system (operation 704). Once triggered, the deployment mechanism spreads apart associated retention members that hold the protrusions of the payload. This action deploys the payload by releasing the payload protrusions and allowing preloaded pusher plate elements to accelerate the payload away from the deployment mechanism (operation 705).

Figure 8:
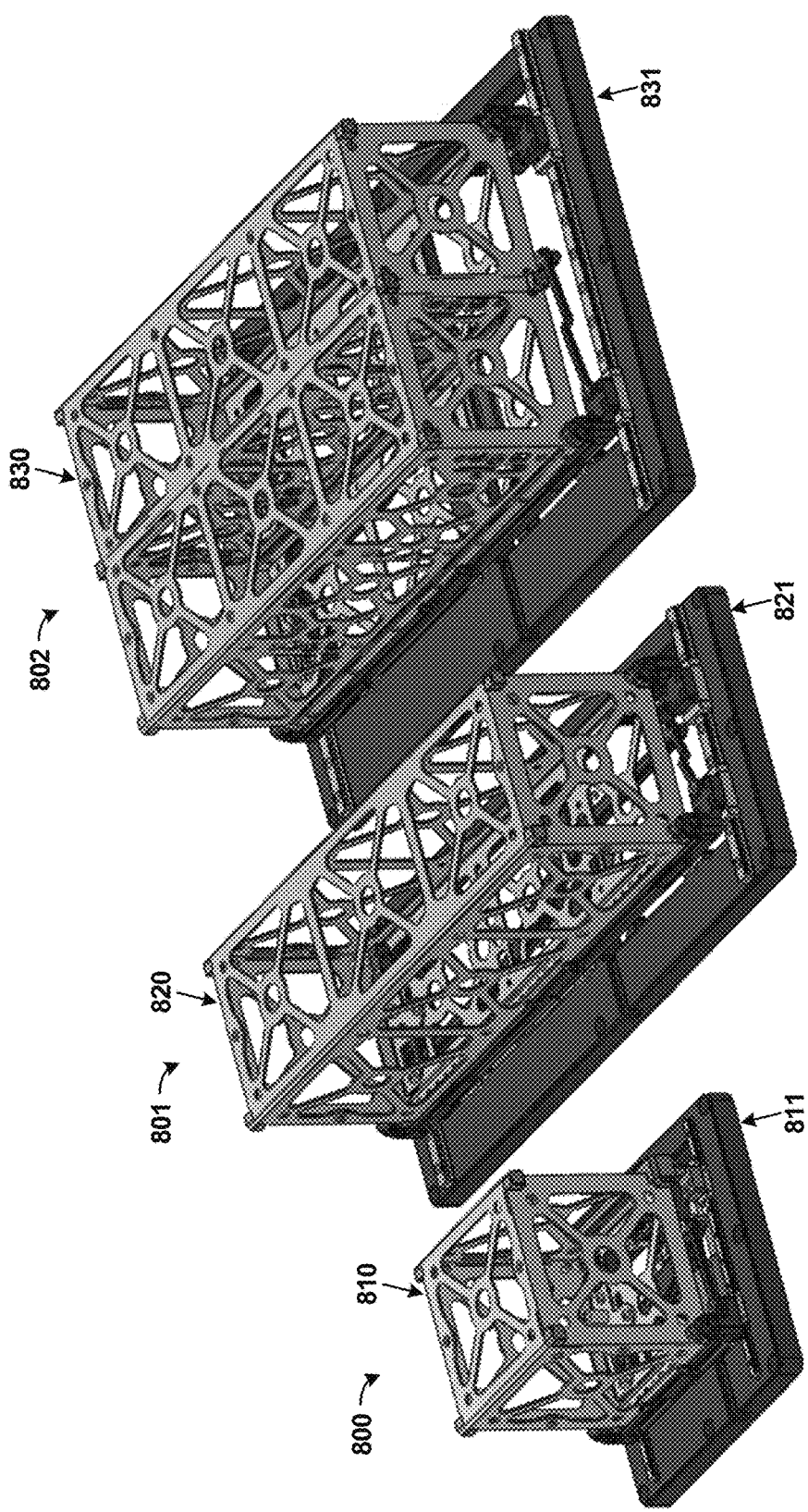
FIG. 8 illustrates example satellite deployment systems.

FIG. 8 illustrates example satellite deployment systems 800-802. These satellite deployment systems 800-802 include similar elements as discussed for those in FIGS. 1-6, however, they are included to illustrate different possible form factors for deploying CubeSat type of payloads. In a first example 800, a 1 U-sized CubeSat 810 is included and stowed into deployer 811. Deployer 811 illustrates hook-style retention elements on a left side and roller-style retention elements on a right side. It should be understood that this configuration of retention elements is merely exemplary and can vary as discussed herein. In a second example 801, a 3 U-sized CubeSat 820 is included and stowed into deployer 821. In a third example 802, a 6 U-sized CubeSat 830 is included and stowed into deployer 831. Further modular configurations are possible than shown in FIG. 8.

Example deployment systems 800-802 each include similar features, despite being of different sizes. Associated mechanical and structural features can be scaled up to suit the larger sizes and scaled down to suit the smaller sizes. Moreover, actuation elements can be selected to exert a desired force commensurate with the scale of deployment systems 800-802. Specifically, the operation of the trigger mechanisms are similar across all sizes, such as a sear element that is actuated by an actuator system, and a hammer element triggered by the sear element. Opposing retention members of each example can slide over associated linear rails to engage and dis-engage rail protrusions of the associated CubeSat.

FIG. 9 illustrates example satellite deployment systems 900-901. View 900 includes several payloads stowed in associated deployment systems/mechanisms, while view 901 includes the payloads immediately after deployment by associated deployment systems/mechanisms. FIG. 9 includes at least two sizes of CubeSats, namely a 1 U size 910 and a 3 U size 911. A central chassis is employed to structurally support each deployment system and couple the individual deployment systems to a common baseplate 920. One example deployment system 930 is shown for clarity in FIG. 9. This combined structure/mechanism can be integrated into an upper stage of a launch system, such as a rocket vehicle. Multiple deployment mechanisms can thus be employed to carry and deploy several payloads, with one deployment mechanism included for each payload/satellite.

FIG. 9 also illustrates optional arms 920-921 which are associated with payloads 910-911. Arms 920-921 can be employed to depress microswitches in each payload, such as the microswitches typically included in rail ends of Cube-Sats. These microswitches can be used to indicate successful deployment of the payload. However, the enhanced deployment mechanisms discussed herein do not require use of arms 920-921. Weight and cost can be reduced by eliminating arms in certain applications. To maintain operation of the microswitches when arms 920-921 are not employed, the payloads can be mounted so that associated protrusions/rails are oriented with microswitches inserted into the deployment mechanism hook features or roller features.

Certain inventive aspects may be appreciated from the foregoing disclosure, of which the following are various examples.

Example 1

A satellite deployment apparatus, comprising opposing retention members configured to engage protrusions of the satellite and hold the satellite with respect to a baseplate, at least one pusher element configured to preload a deployment force on the satellite against the opposing retention members when the protrusions of the satellite are captive in the opposing retention members, and a deployment mechanism configured to spread the opposing retention members responsive to triggering by an actuator system, and release the protrusions of the satellite for deployment of the satellite away from the baseplate using at least the deployment force.

Example 2

The satellite deployment apparatus of Example 1, where the opposing retention members comprise roller portions that couple to the protrusions of the satellite and allow rolling of the opposing retention members with respect to the protrusions when the opposing retention members are spread.

Example 3

The satellite deployment apparatus of Examples 1-2, where the opposing retention members are mounted in linear rails coupled to the baseplate and configured to slide along the linear rails.

Example 4

The satellite deployment apparatus of Examples 1-3, where the opposing retention members restrain movement of the satellite in at least two dimensions when the protrusions of the satellite are engaged by the opposing retention members.

Example 5

The satellite deployment apparatus of Examples 1-4, where the at least one pusher element comprises a compressive spring system compressed when the satellite is engaged into the opposing retention members to establish the deployment force.

Example 6

The satellite deployment apparatus of Examples 1-5, where the deployment mechanism comprises a hammer arm coupled to a hammer member, where the hammer member is held against a sear member by an extension spring, where the sear member is coupled to the actuator system. When triggered by the actuator system, the sear member releases the hammer member and hammer arm. The deployment mechanism further comprises action bars coupled to the hammer arm and the opposing retention members and move the opposing retention members responsive to movement of the hammer arm.

Example 7

The satellite deployment apparatus of Examples 1-6, where the hammer member and the sear are each pivotably coupled to the baseplate by associated bearing features.

Example 8

The satellite deployment apparatus of Examples 1-7, where the actuator system comprises a linear actuator comprising at least one of a leadscrew actuator, ballscrew actuator, linear motor actuator, paraffin actuator, and solenoid actuator.

Example 9

The satellite deployment apparatus of Examples 1-8, where the satellite comprises a CubeSat form factor satellite, and where the protrusions of the satellite comprise rails of the CubeSat.

Example 10

The satellite deployment apparatus of Examples 1-9, where at least one end of the rails of the satellite comprises at least one pressure switch, and where the at least one pressure switch is depressed by a corresponding one of the opposing retention members when the satellite is captive in the opposing retention members.

Example 11

A payload deployer, comprising sliding retention members that engage a payload chassis and hold the payload with respect to a baseplate when the sliding retention members are in a first relative position, and a deployment mechanism that moves the sliding retention members to a second relative position responsive to triggering of a sear element by an actuator, where the second relative position disengages the payload chassis and accelerates the payload away from the baseplate using at least a deployment force established against the payload based at least on insertion of the payload into the payload deployer.

Example 12

The payload deployer of Example 11, where the sliding retention members comprise roller portions that couple to the payload chassis and allow rolling of the roller portions of the sliding retention members with respect to the payload chassis when the opposing retention members are moved to the second relative position.

Example 13

The payload deployer of Examples 11-12, where at least one pusher plate comprising one or more compressive springs is compressed based at least on the insertion of the payload into the payload deployer to establish the deployment force.

Example 14

The payload deployer of Examples 11-13, where the sliding retention members are mounted on linear rails coupled to the baseplate and configured to slide along the linear rails.

Example 15

The payload deployer of Examples 11-14, where the deployment mechanism comprises a hammer element held in contact with the sear element member, where the sear element coupled to the actuator, and based at least on being rotatably moved past a threshold angle by the actuator, the sear element releases the hammer element to be rotated. The deployment mechanism further comprises action bars coupled to the hammer element and the sliding retention members, where the action bars move the sliding retention members along the linear rails into the second relative position responsive to rotation of the hammer element.

Example 16

The payload deployer of Examples 11-15, where the hammer member and the sear are each pivotably coupled to the baseplate.

Example 17

The payload deployer of Examples 11-16, where the actuator comprises a linear actuator comprising at least one of a leadscrew actuator, ballscrew actuator, linear motor actuator, paraffin actuator, and solenoid actuator.

Example 18

The payload deployer of Examples 11-17, where the payload comprises a CubeSat form factor satellite in a 1 U or larger form factor, and where the payload chassis comprises rails of the CubeSat form factor satellite.

Example 19

The payload deployer of Examples 11-18, where at least one end of the rails comprises at least one pressure switch depressed by a corresponding one of the sliding retention members based at least on the rails being captive in the sliding retention members.

Example 20

A method of operating a payload deployment mechanism, the method comprising engaging protrusions of a payload using at least opposing retention members that hold captive the protrusions of the payload when the opposing retention members are in a closed relative position, and locking the opposing retention members into the closed relative position using at least a sear element. Responsive to a threshold level of rotation of the sear element by an actuation system, the method includes triggering rotation of a hammer mechanism that spreads the opposing retention members into an open relative position, and deploying the payload using at least a deployment force established on the payload during insertion of the payload into the payload deployment mechanism.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials, manufacturing processes, and propellants discussed herein are employed according to the descriptions above. However, it should be understood that the disclosures and enhancements herein are not limited to these materials, manufacturing processes, and propellants, and can be applicable across a range of suitable materials, manufacturing processes, and propellants. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A satellite deployment apparatus, comprising:
opposing retention members configured to engage protrusions of the satellite and hold the satellite with respect to a baseplate;
at least one pusher element configured to preload a deployment force on the satellite against the opposing retention members when the protrusions of the satellite are captive in the opposing retention members;
a deployment mechanism configured to spread the opposing retention members responsive to triggering by an actuator system, and release the protrusions of the satellite for deployment of the satellite away from the baseplate using at least the deployment force.

2. The satellite deployment apparatus of claim 1, wherein the opposing retention members comprise roller portions that couple to the protrusions of the satellite and allow rolling of the opposing retention members with respect to the protrusions when the opposing retention members are spread.

3. The satellite deployment apparatus of claim 1, wherein the opposing retention members are mounted in linear rails coupled to the baseplate and configured to slide along the linear rails.

4. The satellite deployment apparatus of claim 1, wherein the opposing retention members restrain movement of the satellite in at least two dimensions when the protrusions of the satellite are engaged by the opposing retention members.

5. The satellite deployment apparatus of claim 1, wherein the at least one pusher element comprises a compressive spring system compressed when the satellite is engaged into the opposing retention members to establish the deployment force.

6. The satellite deployment apparatus of claim 1, wherein the deployment mechanism comprises:

a hammer arm coupled to a hammer member, wherein the hammer member is held against a sear member by an extension spring;
the sear member coupled to the actuator system, and when triggered by the actuator system, releases the hammer member and hammer arm; and
action bars coupled to the hammer arm and the opposing retention members and move the opposing retention members responsive to movement of the hammer arm.

7. The satellite deployment apparatus of claim 6, wherein the hammer member and the sear are each pivotably coupled to the baseplate by associated bearing features.

8. The satellite deployment apparatus of claim 1, wherein the actuator system comprises a linear actuator comprising at least one of a leadscrew actuator, ballscrew actuator, linear motor actuator, paraffin actuator, and solenoid actuator.

9. The satellite deployment apparatus of claim 1, wherein the satellite comprises a CubeSat form factor satellite, and wherein the protrusions of the satellite comprise rails of the CubeSat.

10. The satellite deployment apparatus of claim 9, wherein at least one end of the rails of the satellite comprises at least one pressure switch, and wherein the at least one pressure switch is depressed by a corresponding one of the opposing retention members when the satellite is captive in the opposing retention members.

11. A payload deployer, comprising:
sliding retention members that engage a payload chassis and hold the payload with respect to a baseplate when the sliding retention members are in a first relative position;
a deployment mechanism that moves the sliding retention members to a second relative position responsive to triggering of a sear element by an actuator, wherein the second relative position disengages the payload chassis and accelerates the payload away from the baseplate using at least a deployment force established against the payload based at least on insertion of the payload into the payload deployer.

12. The payload deployer of claim 11, wherein the sliding retention members comprise roller portions that couple to the payload chassis and allow rolling of the roller portions of the sliding retention members with respect to the payload chassis when the opposing retention members are moved to the second relative position.

13. The payload deployer of claim 11, wherein at least one pusher plate comprising one or more compressive springs is compressed based at least on the insertion of the payload into the payload deployer to establish the deployment force.

14. The payload deployer of claim 11, wherein the sliding retention members are mounted on linear rails coupled to the baseplate and configured to slide along the linear rails.

15. The payload deployer of claim 14, wherein the deployment mechanism comprises:
a hammer element held in contact with the sear element member;
the sear element coupled to the actuator, and based at least on being rotatably moved past a threshold angle by the actuator, the sear element releases the hammer element to be rotated; and
action bars coupled to the hammer element and the sliding retention members, wherein the action bars move the sliding retention members along the linear rails into the second relative position responsive to rotation of the hammer element.

16. The payload deployer of claim 15, wherein the hammer member and the sear are each pivotably coupled to the baseplate.

17. The payload deployer of claim 11, wherein the actuator comprises a linear actuator comprising at least one of a leadscrew actuator, ballscrew actuator, linear motor actuator, paraffin actuator, and solenoid actuator.

18. The payload deployer of claim 11, wherein the payload comprises a CubeSat form factor satellite in a 1 U or larger form factor, and wherein the payload chassis comprises rails of the CubeSat form factor satellite.

19. The payload deployer of claim 18, wherein at least one end of the rails comprises at least one pressure switch depressed by a corresponding one of the sliding retention members based at least on the rails being captive in the sliding retention members.

* * * * *